(12) United States Patent
Persinger et al.

(10) Patent No.: US 11,434,983 B2
(45) Date of Patent: Sep. 6, 2022

(54) TORQUE CONVERTER WITH INTERNALLY CONNECTED STUDS

(71) Applicant: SCHAEFFLER TECHNOLOGIES AG & CO. KG, Herzogenaurach (DE)

(72) Inventors: Justin Persinger, Wadsworth, OH (US); Craig McBurney, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 106 days.

(21) Appl. No.: 16/670,757

(22) Filed: Oct. 31, 2019

(65) Prior Publication Data

US 2021/0129666 A1    May 6, 2021

(51) Int. Cl.
*F16H 41/24* (2006.01)
*F16D 33/18* (2006.01)

(52) U.S. Cl.
CPC ............ *F16H 41/24* (2013.01); *F16D 33/18* (2013.01)

(58) Field of Classification Search
CPC .... F16H 41/24; F16H 41/04; F16H 2041/243; F16D 33/18
See application file for complete search history.

(56) References Cited

U.S. PATENT DOCUMENTS

| 2,929,270 | A | * | 3/1960 | Tuck | F16H 47/085 |
| | | | | | 475/47 |
| 6,193,036 | B1 | | 2/2001 | Arhab et al. | |
| 6,327,766 | B1 | * | 12/2001 | Cardente | B23K 9/201 |
| | | | | | 219/98 |
| 8,168,285 | B2 | * | 5/2012 | Strub | F16H 41/24 |
| | | | | | 428/156 |
| 9,683,644 | B2 | | 6/2017 | Smith et al. | |
| 2008/0229570 | A1 | | 9/2008 | Koppitz et al. | |
| 2012/0152681 | A1 | | 6/2012 | Avins | |

FOREIGN PATENT DOCUMENTS

| JP | 2001082574 A | 3/2001 |
| JP | 2012229719 A | 11/2012 |

OTHER PUBLICATIONS

Written Opinion and International Search Report for PCT/US2020/052145, dated Jan. 13, 2021, 11 pages.

* cited by examiner

*Primary Examiner* — Abiy Teka
*Assistant Examiner* — Michael Quandt

(57) ABSTRACT

A torque converter includes an impeller and a cover rotationally fixed to the impeller. The cover has opposing inner and outer surfaces and a through hole extending from the inner surface to the outer surface. A stud is attached to the cover. The stud has a head and a shank extending from the head. The head defines an annular projection circumscribing the shank and raised from the head. The stud is disposed on the cover with the shank extending through the hole to project from the outer surface and with the head being connected to the cover by coalescence between the annular projection and the inner surface creating a hermetic seal around the hole.

12 Claims, 4 Drawing Sheets

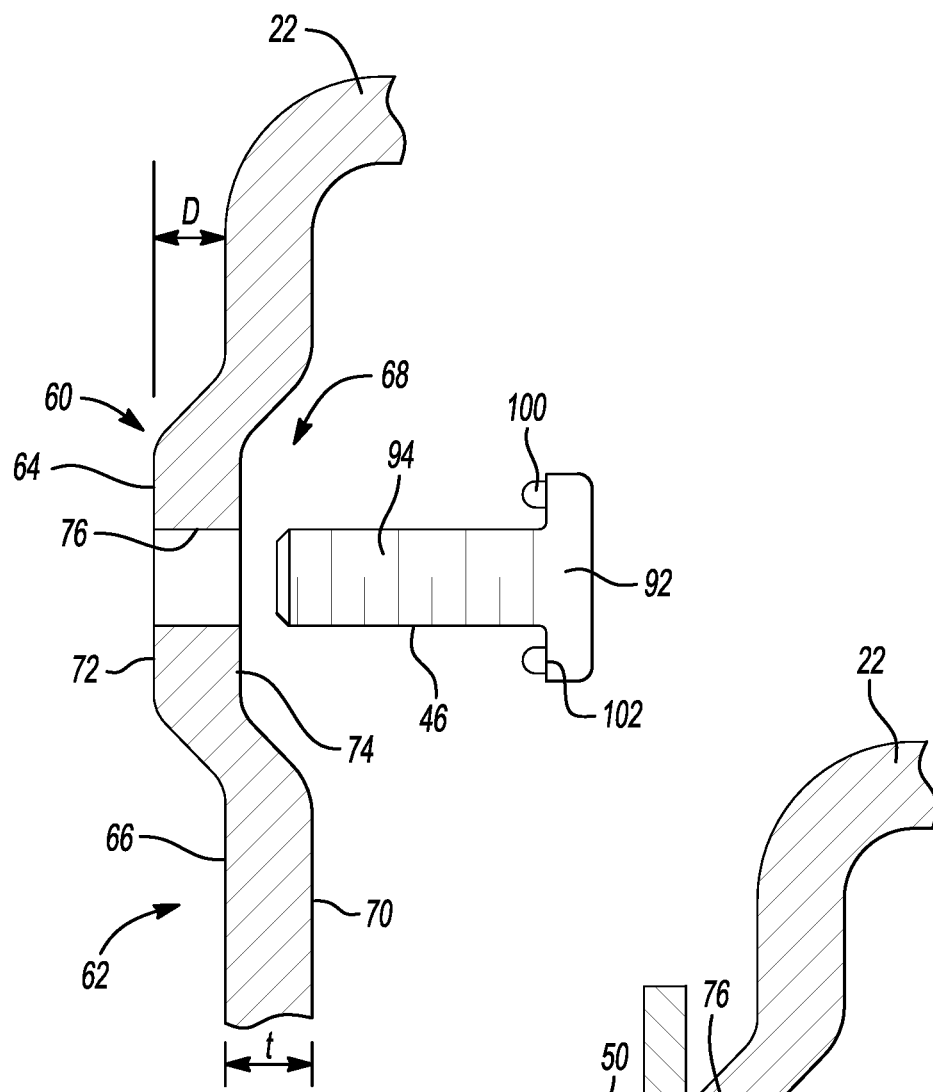
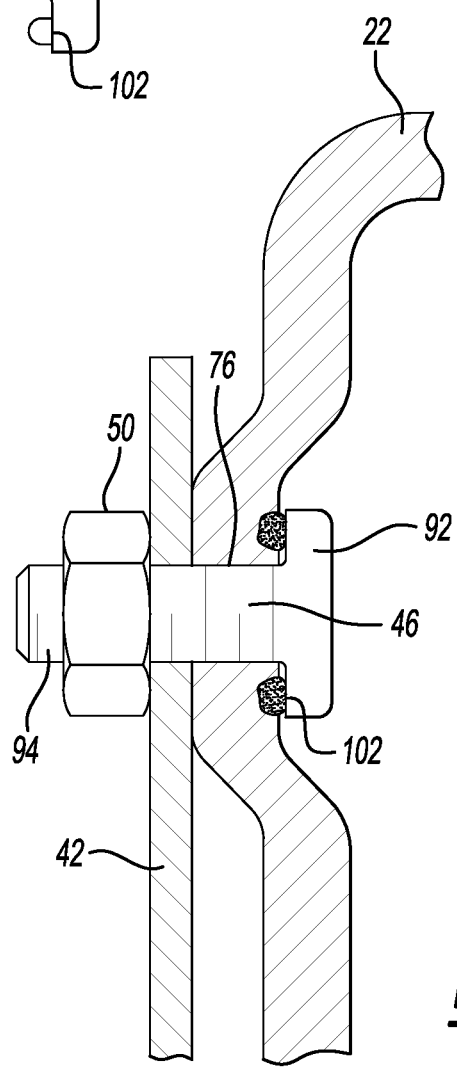
Fig-2
Fig-3

TORQUE CONVERTER WITH INTERNALLY CONNECTED STUDS

TECHNICAL FIELD

The present disclosure relates to torque converters and more specifically to connections between the torque converter and an engine.

BACKGROUND

Automatic transmissions may include a torque converter for coupling a transmission input shaft to a crankshaft of an engine. The torque converter may include an impeller fixed to the crankshaft, a turbine fixed to the input shaft, and a stator disposed between the impeller and the turbine. The torque converter may also include a bypass clutch to mechanically couple the transmission input shaft to the case of the torque converter, which is fixed to the crankshaft.

SUMMARY

According to one embodiment, a torque converter includes an impeller and a cover rotationally fixed to the impeller. The cover has opposing inner and outer surfaces and a through hole extending from the inner surface to the outer surface. A stud is attached to the cover. The stud has a head and a shank extending from the head. The head defines an annular projection circumscribing the shank and raised from the head. The stud is disposed on the cover with the shank extending through the hole to project from the outer surface and with the head being connected to the cover by coalescence between the annular projection and the inner surface creating a hermetic seal around the hole.

According to another embodiment, a method of assembling a torque converter includes providing a cover having opposing inner and outer surfaces and a through hole extending from the inner surface to the outer surface, and installing a threaded stud on the cover with a shank of the stud extending through the hole and with a head of the stud adjacent the inner surface. The head defines an annular projection disposed against the inner surface. The method further includes placing a first electrode against the outer surface adjacent to the shank and placing a second electrode on the head. The method also includes urging the first and second electrodes towards each other to compress the cover against the projection and, during the urging, applying current to one or more of the electrodes to weld the projection to the cover such that the projection coalesces with the cover creating a hermetic seal around the hole.

According to yet another embodiment, a torque converter includes an impeller and a cover rotationally fixed to the impeller. The cover includes a plurality of pressed-out portions circumferentially arranged around the cover. Each of the pressed-out portions forms a boss projecting from an exterior side of the cover, a pocket recessed into an interior side of the cover, and a hole extending completely through the cover. A plurality of studs are attached to the cover at the pressed-out portions. Each stud has a head, a shank extending from the head, and an annular projection extending from the head and circumscribing the shank. The studs are disposed on the cover with the shanks extending through corresponding ones of the holes and with the heads being disposed in corresponding ones of the pockets. The studs are connected to the cover by coalescence between the annular projections and walls of the pockets creating hermetic seals around the holes.

BRIEF DESCRIPTION OF THE DRAWINGS

FIG. 2 is an exploded schematic view of a pressed-out portion of a torque-converter cover and a stud for connecting the torque converter to an engine.

FIG. 3 is a schematic cross-sectional view of a front-cover area of the torque converter.

DETAILED DESCRIPTION

Figure 1:
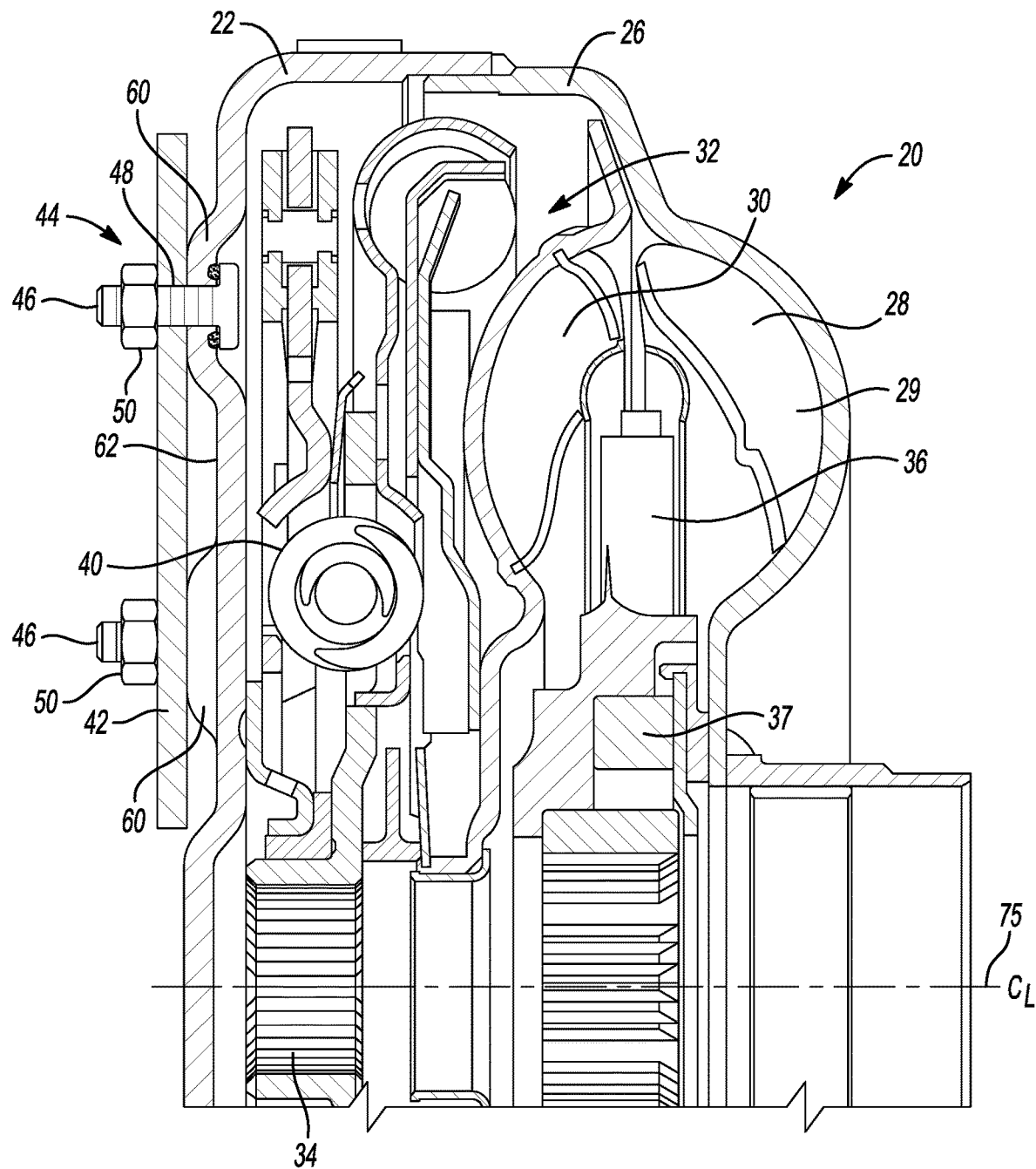
FIG. 1 is a schematic cross-sectional view of a torque converter.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "radial," "diameter," "circumference," etc. are also relative to the central axis. The terms "front," "rear," "upper" and "lower" designate directions in the drawings to which reference is made.

Referring to FIG. 1, a torque converter 20 may be used in a vehicle to couple an automatic transmission to a powerplant, e.g., an engine. For example, the torque converter 20 includes a cover 22 fixed to a crankshaft of the engine. An impeller 28 is fixed to the cover 22 and rotates with the crankshaft. The impeller 28 may include a rear shell 26 joined to the cover and blades 29 fixed to the shell 26. A turbine 30 is disposed adjacent to the impeller 28 within a hydrodynamic chamber 32 of the torque converter 20. The turbine 30 is attached to a turbine hub 34 that is connected, e.g., splined, to a transmission input shaft that supplies power to the transmission. A damper 40 may be interposed between the turbine 30 and the turbine hub 34.

A stator 36 is coupled to a stator shaft (not shown) by a one-way clutch 37. The stator shaft is fixed to a front support of the transmission and is stationary relative to the torque converter 20. When the transmission input shaft is stationary or rotating slowly compared to the crankshaft, the one-way clutch 32 holds the stator 36 stationary. Rotation of the impeller 28 forces fluid to move between the impeller 28, the turbine 30, and the stator 36. The fluid exerts a hydrodynamic torque on the turbine 30. The stator 36 provides a reaction force causing the torque on the turbine 30 to be greater than the torque on the impeller 28. When the speed of the turbine 30 approaches that of the impeller 28, fluid tends to flow around the centerline of the torque converter, causing the one-way clutch 37 to overrun.

The torque converter 20 may include a bypass clutch (not shown) that mechanically connects the turbine 30 to the cover 22 to bypass the hydrodynamic power flow path of the torque converter 20. The bypass clutch is often engaged during cruise to improve fuel efficiency. The bypass clutch may include a clutch disc operated by a clutch piston.

The cover 22 is connected to the crankshaft of the engine via a flywheel or the illustrated flex plate 42. The flex plate 42 is connected to the cover 22 via a plurality of connections 44, e.g., fastener connections. In the illustrated embodiment, the cover 22 includes a plurality of projecting studs 46 that are inserted through holes 48 defined in the flex plate 42. The cover 22 is connected to the flex plate 42 by inserting the studs 46 through the holes 48 and securing fasteners 50, e.g., nuts, on the studs 46.

Referring to FIGS. 1, 2, and 3, the cover 22 may be formed as a stamping. Here, the cover 22 is stamped to create a plurality of pressed-out portions 60 circumferentially arranged around the front side 62 of the cover 22. The pressed-out portions 60 provide clearance for the studs within the interior of the cover 22 and provide contact surface for the flex plate 42. For example, cover 22 may include three to eight pressed-out portions 60. The pressed-out portions 60 may be equally spaced relative to each other, i.e., equal angular distance between adjacent pressed-out portions 60. For example, the cover 22 may include four pressed-out portions spaced 90 degrees from each other. Each pressed-out portion 60 may include a boss 64 projecting from an exterior side 66 of the cover 22 and a pocket 68 recessed into an interior side 70 of the cover 22. The front side 62 has a thickness (t) measured between the exterior side 66 and the interior side 70. The thickness (t) may be measured at the thickest part of the front side 62. The boss 64 includes a flat face 72 configured to engage with the flex plate 42. The flat face 72 may be spaced from the exterior side 66 of the cover by a distance (D) that is greater than or equal to 0.05, 0.04, 0.03, 0.02 or 0.01 times the thickness (t). The pocket 68 also includes a flat face 74 that is recessed into the interior side 70. The faces 72 and 74 may be substantially parallel to each other such that a distance between the faces 72 and 74 are substantially constant. The faces 72 and 74 may be substantially perpendicular to a centerline 75 of the of the torque convert 20 to present flat abutting surfaces for the flex plate 42 to seat against. Used herein, "substantially" refers to being±2% of a stated value. Holes 76 are defined through the cover 22 at the pressed-out portions 60. The holes 76 extend completely through the cover 22 from the flat face 74 to the flat face 72. The holes 76 may be circular to match circular studs 46. The studs 46 and the holes 76, however, may include other cross-sectional shapes in other embodiments.

Figure 4A:
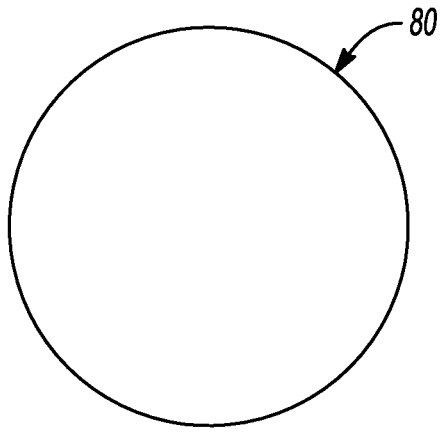
FIG. 4A is a front view of a pressed-out portion according to one embodiment.
Figure 4B:
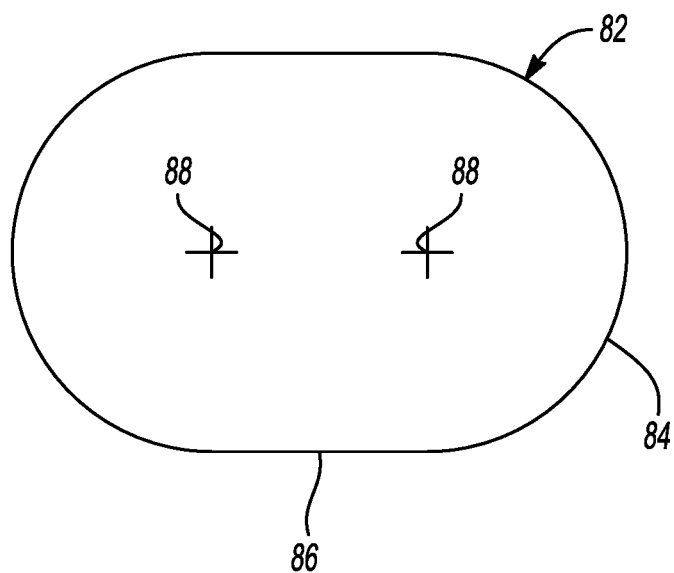
FIG. 4B is a front view of a pressed-out portion according to another embodiment.
Figure 4C:
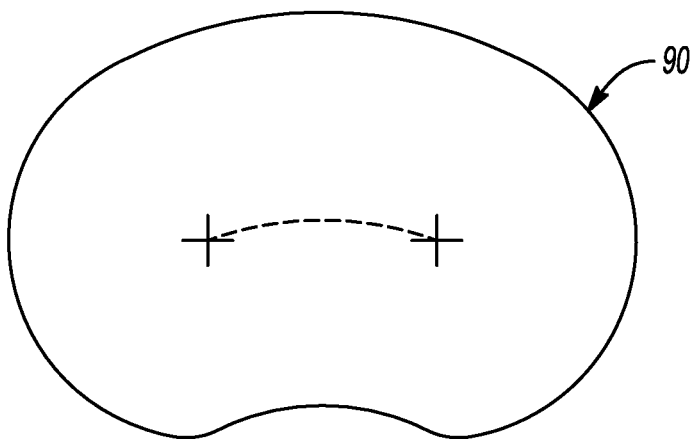
FIG. 4C is a front view of a pressed-out portion according to yet another embodiment.
Figure 5:
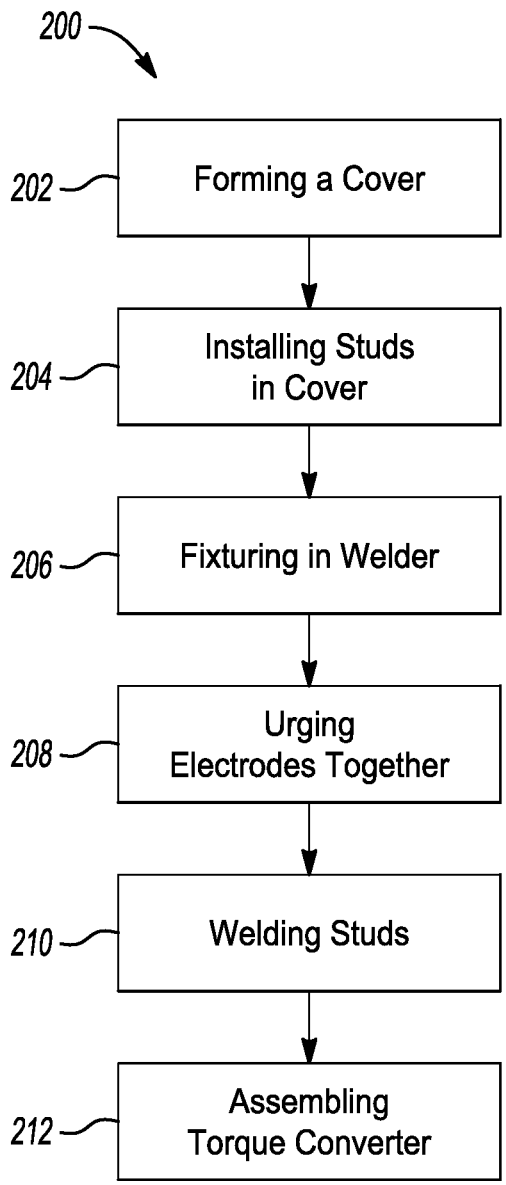
FIG. 5 is a flow chart of a method of manufacturing a torque converter.
Figure 6:
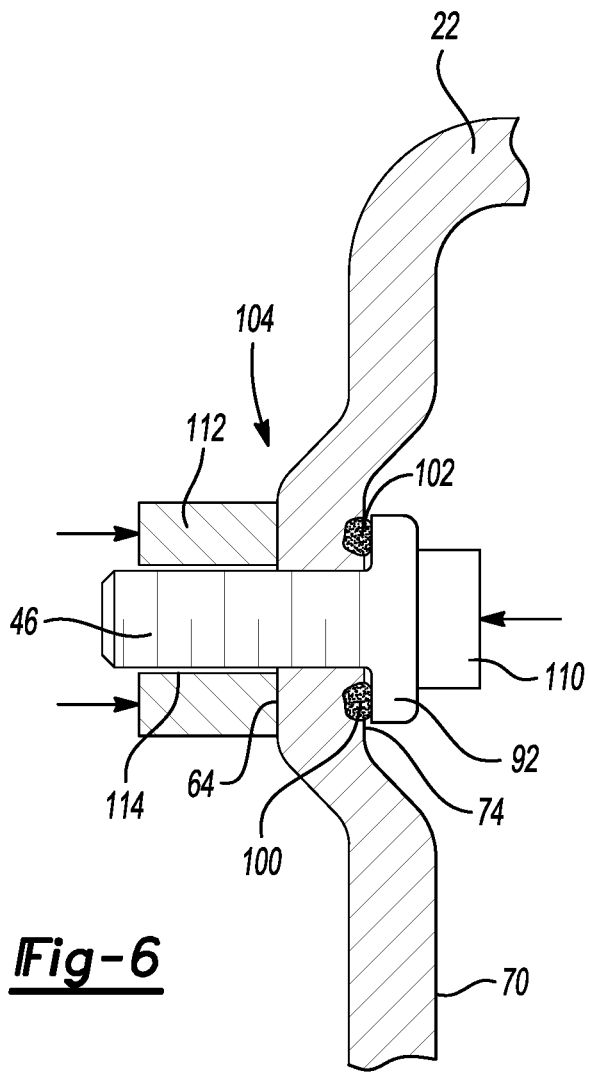
FIG. 6 is a schematic cross-sectional view of a stud being welded to a torque-converter cover.

Referring to FIGS. 4A, 4B, and 4C, the pressed-out portions may take a variety of different shapes. FIG. 4A illustrates a circular pressed-out portion 80. The circular portion 80 occupies the least amount of space but has a smaller flex-plate contact area compared to other designs. FIG. 4B illustrates an elongated pressed-out portion 82 that provides increase contact with the flex plate. The elongated portion 82 may include a pair of spaced apart semicircles 84 that are interconnected by tangential lines 86. The size of the elongated portion 82 can be increased or decreased by varying the distance between the centers 88 of the semicircles 84. FIG. 4C illustrates another elongated pressed-out portion (bean-shaped portion 90). The bean-shaped portion 90 functions similar to the elongated portion 82 to increase the contact area with the flex plate. The pressed-out portions may include other shapes.

Referring back to FIG. 2, each stud 46 includes a head 92 and a shank 94. The shank 94 may define threads for threadably connecting with a threaded fastener. In other embodiments, the shank 94 may define other retention features that cooperate with another type of retainer. The shank 94 may be cylindrical having a diameter sized to fit through the holes 76 and 48. The shank 94 extends through the cover and the flex with enough projecting to receive the retainer, e.g., a nut. The head 92 may be cylindrical, e.g., circular, and has a diameter that is larger than the shank 94 so that the head 92 engages with the cover 22.

The studs 46 may be connected to the cover 22 by welding. For example, the studs may be resistance welded to the face 74 of the pocket 68. Capacitive-discharge welding (CD welding) is one type of resistance welding that may be used. CD welding achieves coalescence through solid-state welds (although melting may occur in some applications). A CD welder includes large capacitors that store energy for quick release to electrodes that contact the workpiece(s). CD welding has many advantages including high welding currents, very quick welding times, e.g., hundredths of a second, a smaller heat affected zone (typically, the CD weld is complete before the surrounding area heats up), improved weldability of higher carbon steels, simple controls, high repeatability, low electrical power requirements, and long electrode life. Pressure is often used during CD welding and the electrodes may be disposed on a clamp configured to squeeze the workpieces to be joined. Workpieces to be CD welded often include projections or the like on at least one of the workpieces. The projections contact the other workpiece and form the electrical bridge. Since the projections are relatively small, they heat up and soften (or melt) quickly to coalescence with the other workpiece. The simultaneous clamping force deforms the softened or molten projections to bring the workpieces together and form a close joint.

Each stud 46 may include an annular projection 100 extending from a bottom side 102 of the head 92. The annular projection 100 may be a raised ring that completely encircles the shank 94. The annular projection 100 may be centered on a centerline of the stud 46. The studs 46 are joined to the cover 22 by welding the annular projections 100 to the flat faces 74. The welding process deforms and coalesces the projections 100 and the flat faces 74 to secure the studs 46 in place via welds 102. The welds 102 also form hermetic seals around the holes 76 to seal the torque converter 26 and prevent oil from leaking around the studs 46. The studs 46 may be formed of steel.

Described below are example methods of assembling a torque converter. For easy of description, the method will be described in conjunction with the illustrated embodiment, but the method is not limited thereto. Referring to the flow chart of FIG. 5 and FIGS. 2, 3, and 6, a method 200 of assembling a torque converter includes forming a cover at operation 202. The cover 22 may be formed by a stamping operation that forms the pressed-out portions 60 in addition to other features of the cover 22. The stamping process may be performed in one or more steps. Once the cover 22 is stamped, one or more secondary operations may be performed. For example, the holes 76 may be formed through the pressed-out portions 60. The holes 76 may be formed by drilling, punching, and the like. The front and back faces 72, 74 of the pressed-out portion may be machined flat (if needed) to provide a good contact surface for the flex plate 42 and for the annular projections 100 of the studs. Stamping is of course only one possible forming method for the cover, and other methods, such as casting or machined-from-solid may be used.

Once the cover 22 is formed, the method advances to operation 204 and the one or more studs 46 are installed into cover. Each stud 46 may be installed by inserting the shank 94 of the stud through the holes 76 of the cover 22 so that the annular projection 100 is disposed against the wall 74 of the pocket 68.

At operation 206, the cover 22 with the studs 46 disposed through the holes 76 is fixtured in a welder. The welder may be a CD welder including one or more first electrodes configured to engage with one or more of the heads 92 of the studs and one or more second electrodes configured to engage with one or more bosses 64 of the cover 22. The welder may be configured to weld one stud to the cover 22 at a time or, the welder may include a plurality of the first and second electrodes so that all of the studs may be welded in a single operation. Focusing on a single weld location 104 for description, the welder includes a first electrode 110 configured to engage with a top side of the head 92 and a second electrode 112 configured to engage with the boss 64. The second electrode 112 may define a hole 114 that receives the shank 94 therethrough.

The electrodes 110, 112 are configured to move towards and away from each other. The electrodes 110, 112 are urged toward each other to compress the projection 100 against the flat face 74 at step 208. At step 210, while continuing to urge the electrodes 110, 112 together, the welder supplies current to at least one of the electrodes to resistance weld the studs 46 to the interior side 70 of the cover 22. The current travels through the projection 100, which are the electrical bridges, causing it to heat up and soften (or melt). The compressive pressure flattens the projection to form a close joint. The projection forms solid a state welds 102 that encircles the hole 76 once welding is complete.

After the studs 46 are welded, the remaining components of the torque converter 20 may be assembled to form a completed torque converter assembly at operation 212. During later installation of the torque converter 20 to the engine, the studs 46 will be inserted through holes of the flex plate and a retainer, such as a nut 50, will be driven down onto the studs to connect the torque converter to the crankshaft the engine.

The above-discussed method steps are not an exhaustive list of all steps for fully assembling a torque converter and instead explain a representative basis for employing internally welded studs used for connecting the cover to the flex plate. While the method steps are described in a particular sequence, the steps may be performed in other sequences and some steps may be omitted in some embodiments.

The above-described torque converter design may improve weldability of the studs to the cover while also increasing the strength of the connection between the studs and the cover. In this design, the tensile forces developed in the stud due to the tightening of the nut are exerted on the head of the stud and not on the weld, which is in compression. This increases fatigue resistance of the weld compared to other designs in which the weld is loaded in tension. This design may also reduce axial length of the torque converter by moving the weld location from the exterior side to the interior side of the cover.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST torque converter 20
cover 22
shell 26
impeller 28
blades 29
turbine 30
hydrodynamic chamber 32
turbine hub 33
stator 36
one-way clutch 37
damper 40
flex plate 42
fastener connections 44
studs 46
holes 48
fasteners 50
pressed-out portion 60
front side 62
boss 64
exterior side 66
pocket 68
interior side 70
flat face 72
flat faces 74
centerline 75
holes 76
circular pressed-out portion 80
elongated pressed-out portion 82
semicircles 84 tangential lines 86
centers 88
bean-shaped portion 90
head 92
shank 94
annular projection 100
welds 102
electrodes 110, 112
hole 114

What is claimed is:

1. A torque converter comprising:
an impeller;
a cover rotationally fixed to the impeller, the cover including opposing inner and outer surfaces, a through hole extending from the inner surface to the outer surface, a pressed-out portion circumferentially arranged around a front side of the cover, the pressed-out portion having a boss extending outwardly from the outer surface, the boss having a flat face, wherein the pressed-out portion is bean shaped; and
a stud including a head and a shank extending from the head, the head defining an annular projection circumscribing the shank and raised from the head, wherein the stud is disposed on the cover with the shank extending through the hole to project from the outer surface and with the head being connected to the cover by coalescence between the annular projection and the inner surface creating a hermetic seal around the hole.

2. The torque converter of claim 1, wherein the cover further includes a pocket recessed into the inner surface, wherein the hole is defined in the pressed-out portion and the head is received in the pocket.

3. The torque converter of claim 2, wherein the pocket includes a first wall and the boss includes a second wall that is opposite the first wall, and wherein a thickness between the first and second walls is constant.

4. The torque converter of claim 1 further comprising a turbine and a stator.

5. The torque converter of claim 1, wherein the through hole is a plurality of through holes circumferentially arranged around the cover, and wherein the stud is a plurality of studs each extending though a corresponding one of the holes.

6. The torque converter of claim 5, wherein the studs are threaded.

7. The torque converter of claim 1, wherein the stud is resistance welded to the cover.

8. The torque converter of claim 1 further comprising a flex plate defining a hole, wherein the shank extends through the hole of the flex plate and a fastener is threadably attached to the shank to secure the flex plate to the cover.

9. The torque converter of claim 1, wherein the projection is a raised ring.

10. A torque converter comprising:
an impeller;
a cover rotationally fixed to the impeller, the cover including a plurality of pressed-out portions circumferentially arranged around the cover, each of the pressed-out portions forming a boss projecting from an exterior side of the cover, the boss having a flat face, wherein the pressed-out portion is bean shaped;
a pocket recessed into an interior side of the cover, and a hole extending completely through the cover; and
a plurality of studs attached to the cover at the pressed-out portions, each stud including a head, a shank extending from the head, and an annular projection extending from the head and circumscribing the shank, wherein the studs are disposed on the cover with the shanks extending through corresponding ones of the holes and with the heads being disposed in corresponding ones of the pockets, and wherein the studs are connected to the cover by coalescence between the annular projections and walls of the pockets creating hermetic seals around the holes.

11. The torque converter of claim 10, wherein the projections are raised rings.

12. The torque converter of claim 10, wherein the shanks are threaded.

* * * * *